(12) United States Patent
Akdim

(10) Patent No.: US 9,687,757 B2
(45) Date of Patent: Jun. 27, 2017

(54) HIGH EFFICIENCY PHASE SPLITTER

(75) Inventor: Mohamed Reda Akdim, Nieuwegein (NL)

(73) Assignee: FMC Separation Systems, BV, Amsterdam (NL)

( * ) Notice: Subject to any disclaimer, the term of this patent is extended or adjusted under 35 U.S.C. 154(b) by 524 days.

(21) Appl. No.: 13/816,192

(22) PCT Filed: Aug. 11, 2010

(86) PCT No.: PCT/EP2010/004909
§ 371 (c)(1),
(2), (4) Date: May 23, 2013

(87) PCT Pub. No.: WO2012/019624
PCT Pub. Date: Feb. 16, 2012

(65) Prior Publication Data
US 2013/0247765 A1    Sep. 26, 2013

(51) Int. Cl.
| | | |
|---|---|---|
| *B01D 19/00* | (2006.01) | |
| *B01D 45/16* | (2006.01) | |
| *B04C 3/06* | (2006.01) | |
| *B04C 5/107* | (2006.01) | |
| *B04C 5/181* | (2006.01) | |

(52) U.S. Cl.
CPC ......... *B01D 19/0057* (2013.01); *B01D 45/16* (2013.01); *B04C 3/06* (2013.01); *B04C 5/107* (2013.01); *B04C 5/181* (2013.01)

(58) Field of Classification Search
CPC .......... B04C 3/06; B04C 5/107; B04C 5/181; B01D 19/0057

USPC .................................................. 96/204–217
See application file for complete search history.

(56) References Cited

U.S. PATENT DOCUMENTS

| | | | |
|---|---|---|---|
| 4,842,145 A | 6/1989 | Boadway | |
| 6,679,930 B1 * | 1/2004 | An et al. ......................... | 55/337 |
| 6,752,860 B1 * | 6/2004 | Hoydal ............. | B01D 17/0208 166/105.5 |

(Continued)

FOREIGN PATENT DOCUMENTS

| | | |
|---|---|---|
| WO | WO 96/06683 A1 | 3/1996 |
| WO | WO 00/64321 A1 | 11/2000 |

(Continued)

*Primary Examiner* — T. Bennett McKenzie
(74) *Attorney, Agent, or Firm* — Henry C. Query, Jr.

(57) ABSTRACT

A phase splitter for separating a multiphase fluid into a relatively light phase and a relatively heavy phase includes a separator tube which comprises a fluid inlet through which the multiphase fluid enters the apparatus, a heavy phase outlet through which the heavy phase exits the apparatus and an inner diameter surface which defines a flow bore that extends between the fluid inlet and the heavy phase outlet. A swirl element positioned in the flow bore downstream of the fluid inlet causes the multiphase fluid to rotate and separate the heavy phase from the light phase. The light phase forms an elongated core which extends axially through the flow bore radially inwardly of the heavy phase from proximate the swirl element toward the heavy phase outlet. A core stabilizer is positioned in the flow bore between the swirl element and the heavy phase outlet and engages the distal end of the light phase core to thereby inhibit the light phase from exiting the apparatus through the heavy phase outlet.

7 Claims, 4 Drawing Sheets

(56) References Cited

U.S. PATENT DOCUMENTS

2008/0006011 A1* 1/2008 Larnholm .......... B01D 17/0217
 55/421

FOREIGN PATENT DOCUMENTS

| WO | WO 2007/021181 A1 | 2/2007 |
| WO | WO 2008/000753 A1 | 1/2008 |

* cited by examiner

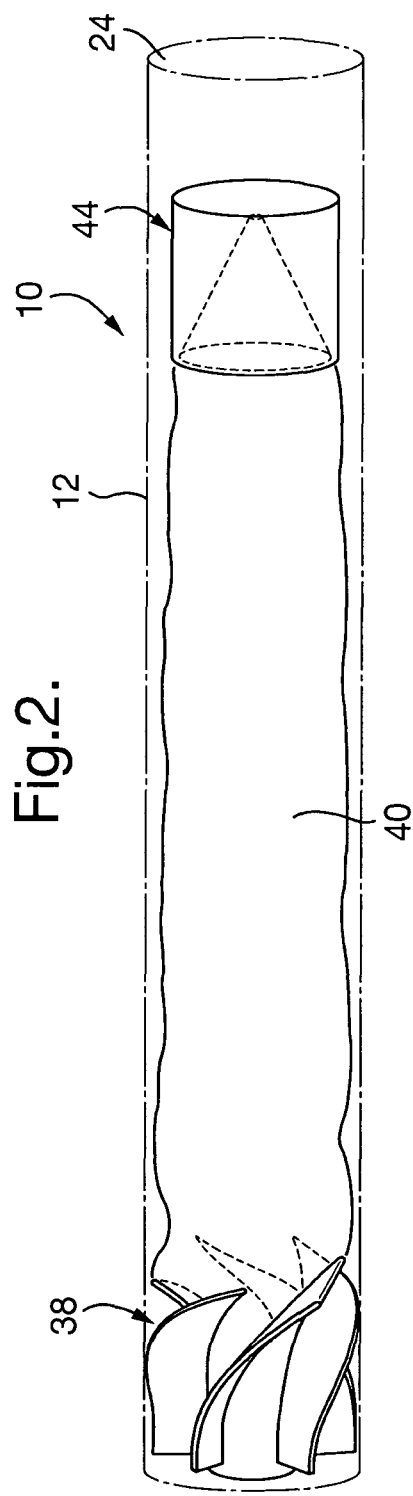
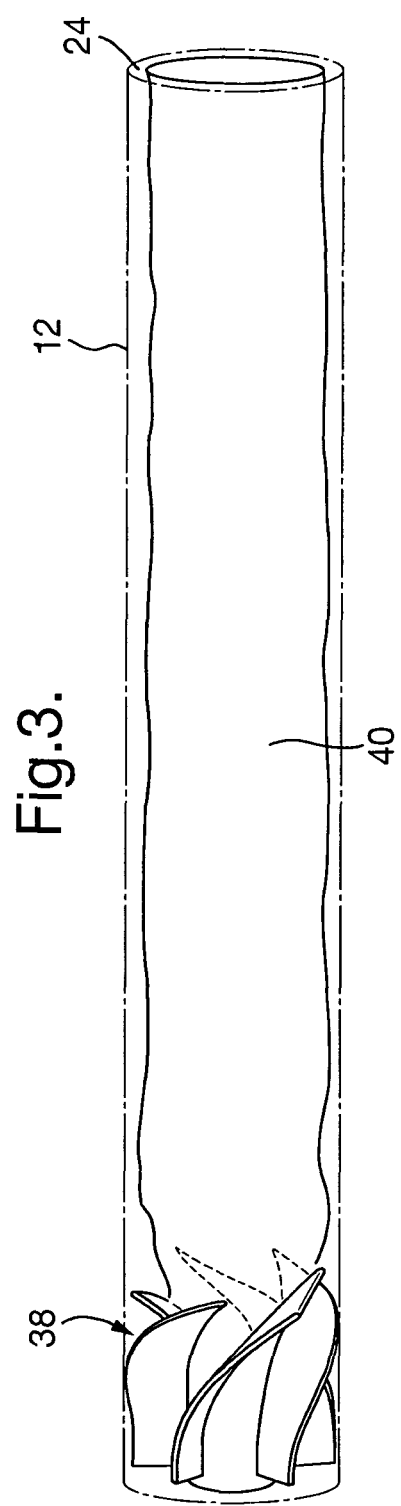

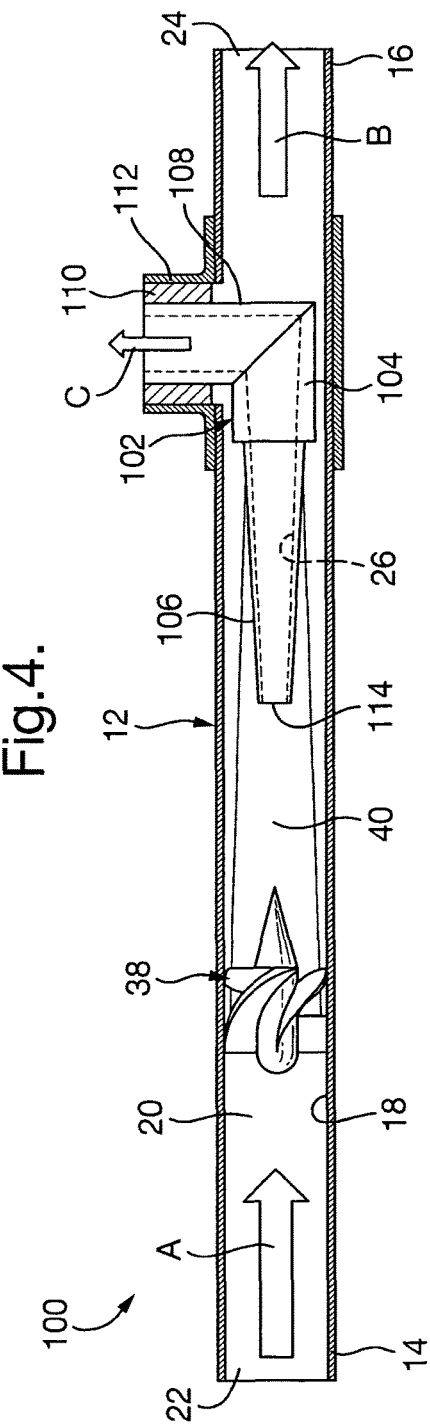
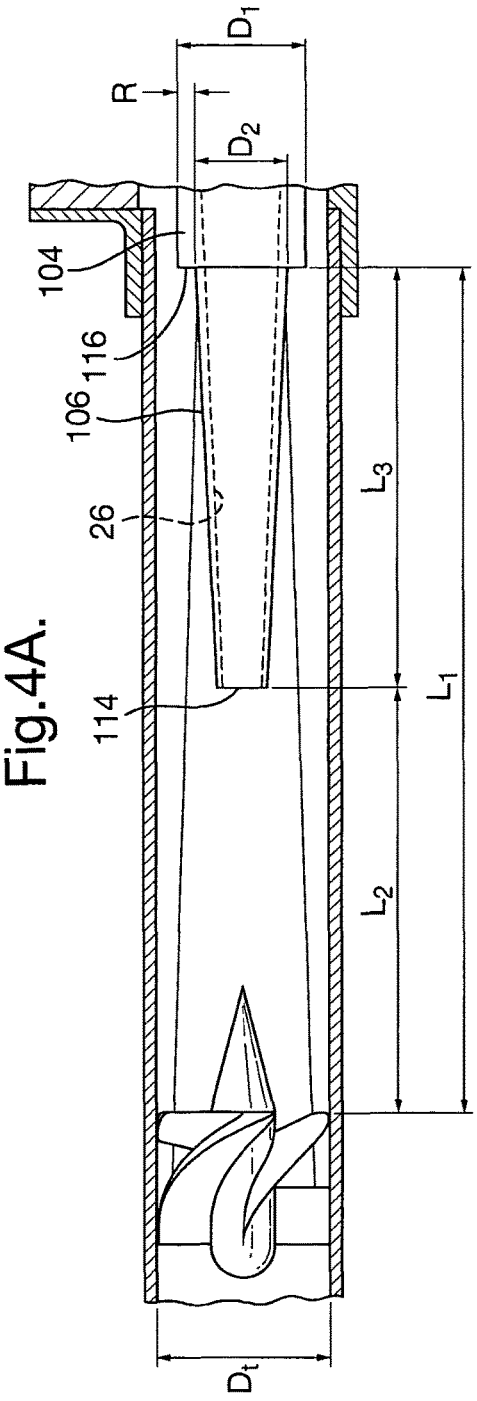

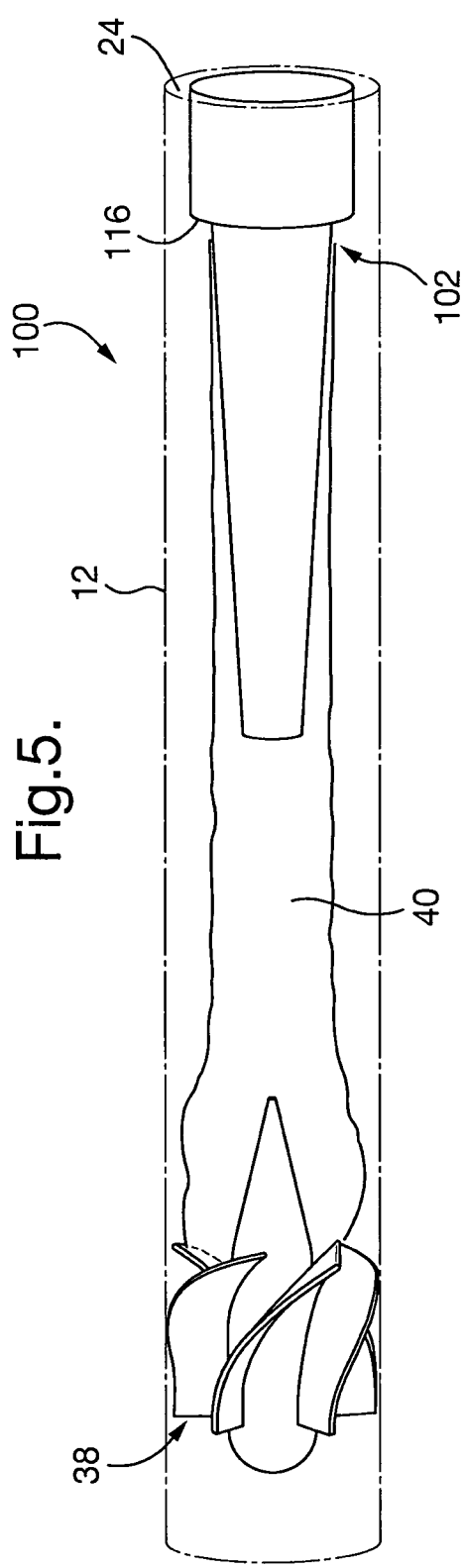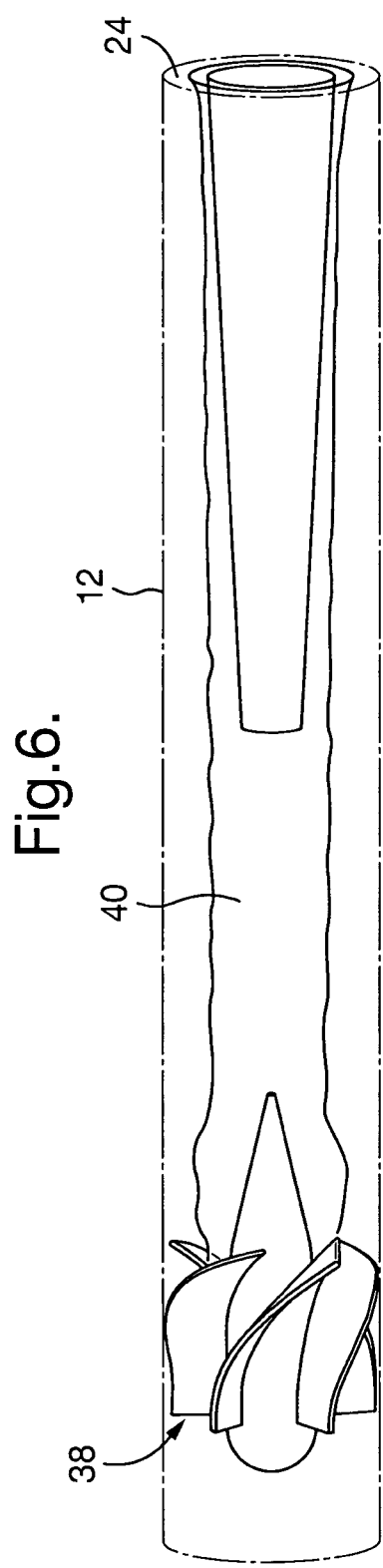

HIGH EFFICIENCY PHASE SPLITTER

BACKGROUND OF THE INVENTION

The present invention relates to an apparatus for separating a multiphase fluid, such as a mixture of oil and gas, into its constituent heavy and light phases. In particular, the invention relates to a phase splitter which includes a core stabilizer for inhibiting the light phase from exiting through the heavy phase outlet in the event of fluctuations in the multiphase fluid stream.

Phase splitters are used in the hydrocarbon production industry to separate multiphase fluid streams into their different fractions or phases. For example, phase splitters are commonly used to separate the production fluid from a hydrocarbon well into separate streams of oil and gas so that these constituents can be transported and processed separately. These phase splitters operate by rotating the multiphase fluid to create centrifugal forces which cause the heavy phase to move toward the radially outer region of the fluid stream and the light phase to form a core in the radially inner region of the fluid stream.

In prior art phase splitters, fluctuations in the flow of the multiphase fluid stream may cause the light phase core to become unstable. This instability can be particularly severe near the distal end of the light phase core and can result in an undesirably large quantity of the light phase exiting the phase splitter through the heavy phase outlet. As a result, the separation efficiency of the phase splitter is greatly reduced.

SUMMARY OF THE INVENTION

These and other limitations in the prior art are overcome by providing an apparatus for separating a multiphase fluid into a relatively light phase and a relatively heavy phase, the apparatus comprising a separator tube which comprises a fluid inlet through which the multiphase fluid enters the apparatus, a heavy phase outlet through which the heavy phase exits the apparatus and an inner diameter surface which defines a flow bore that extends between the fluid inlet and the heavy phase outlet; a swirl element which is positioned in the flow bore downstream of the fluid inlet and which causes the multiphase fluid to rotate and separate the heavy phase from the light phase, the light phase forming an elongated core which extends axially through the flow bore radially inwardly of the heavy phase from proximate the swirl element toward the heavy phase outlet; a discharge channel through which the light phase exits the apparatus, the discharge channel being fluidly connected to a radially inner region of the flow bore; and a core stabilizer which is positioned in the flow bore between the swirl element and the heavy phase outlet and which engages the distal end of the light phase core to thereby inhibit the light phase from exiting the apparatus through the heavy phase outlet.

In accordance with one embodiment of the invention, the core stabilizer comprises a cylindrical body which is positioned coaxially within the separator tube and the body comprises a cavity which includes an upstream opening, a downstream end and an inner surface which converges radially inwardly from the upstream opening to the downstream end. The inner surface may converge generally linearly from the upstream opening to the downstream end. For example, the inner surface may converge at an angle of between about 15° and about 45°. More preferably, the inner surface may converge at an angle of between about 25° and about 35°.

In this embodiment of the invention, the body may comprise an outer diameter which is between about 65% and about 85% of the inner diameter of the separator tube. In addition, the upstream opening may comprise a diameter which is between about 50% and about 70% of the inner diameter of the separator tube. Furthermore, the cavity may comprise an axial length from the upstream opening to the downstream end which is between about 100% and 150% of the diameter of the upstream opening. Also, the axial distance between the downstream end of the swirl element and the upstream opening of the cavity is between about 4 times and about 5 times the inner diameter of the separator tube.

In accordance with another embodiment of the invention, the body may be supported in the separator tube by a support ring which comprises a number of axial holes through which the heavy phase flows. Alternatively, the body may be supported in the separator tube by a number of radial fins which extend between the body and the separator tube.

In accordance with yet another embodiment of the invention, the discharge channel may extend axially through the swirl element and comprise a discharge opening in the downstream end of the swirl element.

In accordance with an alternative embodiment of the invention, the apparatus comprises a discharge body which is positioned coaxially within the separator tube and includes a cylindrical portion, a conical portion which comprises a base that is attached to or formed integrally with an upstream end of the cylindrical portion, and a radial shoulder which is formed between the conical portion and the cylindrical portion, wherein the core stabilizer comprises the radial shoulder.

In this embodiment of the invention, the cylindrical portion may comprise an outer diameter which is between about 70% and about 90% of the inner diameter of the separator tube. In addition, the radial shoulder may comprise a radius which is between about 6% and about 18% of the outer diameter of the cylindrical portion. Furthermore, the radial shoulder may comprise a radius which is between about 10% and about 22% of the outer diameter of the base of the conical portion. Also, the axial distance between the downstream end of the swirl element and the radial shoulder may be between about 4 times and about 5 times the inner diameter of the separator tube.

In accordance with still another embodiment of the invention, the discharge channel extends axially through the discharge body and comprises a discharge opening in the upstream end of the conical portion. In this embodiment, the axial distance between the downstream end of the swirl element and the discharge opening may be between about 2 times and 3 times the inner diameter of the separator tube. In addition, the axial length of the conical portion may be between about 2 times and 3 times the inner diameter of the separator tube.

Thus, the present invention provides a core stabilizer which engages the distal end of the light phase core and inhibits the light phase from exiting the separator tube through the heavy phase outlet even under the influence of fluctuations in the flow of multiphase fluid through the fluid inlet. As a result, the separation efficiency of the phase splitter is greatly improved.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 2 is an illustration obtained from a computational fluid dynamics simulation of the phase splitter shown in FIG. 1;

FIG. 3 is an illustration obtained from a computational fluid dynamics simulation of a phase splitter similar to the phase splitter of FIG. 1 but without the core stabilizer component of the invention;

FIG. 4 is a cross sectional representation of a phase splitter in accordance with another embodiment of the present invention;

FIG. 4A is an enlarged view of a portion of the phase splitter of FIG. 4 showing more clearly the core stabilizer component of this embodiment of the invention;

FIG. 5 is an illustration obtained from a computational fluid dynamics simulation of the phase splitter shown in FIG. 4; and FIG. 6 is an illustration obtained from a computational fluid dynamics simulation of a phase splitter similar to the phase splitter of FIG. 4 but without the core stabilizer component of the invention;

DETAILED DESCRIPTION OF THE INVENTION

The present invention is directed to a phase splitter for separating out the individual phases of a multiphase fluid. In the hydrocarbon production industry, for example, the fluid produced from a subterranean well may comprise a mixture of a relatively light phase such as gas and a relatively heavy phase such as oil. In this situation, a common objective is to separate the gas from the oil so that these separate phases may be transported and processed separately. Although the invention can be used with a number of multiphase fluids and in a variety of industries, for purposes of simplicity it will be described herein in the context of a device for separating gas from oil.

Figure 1:
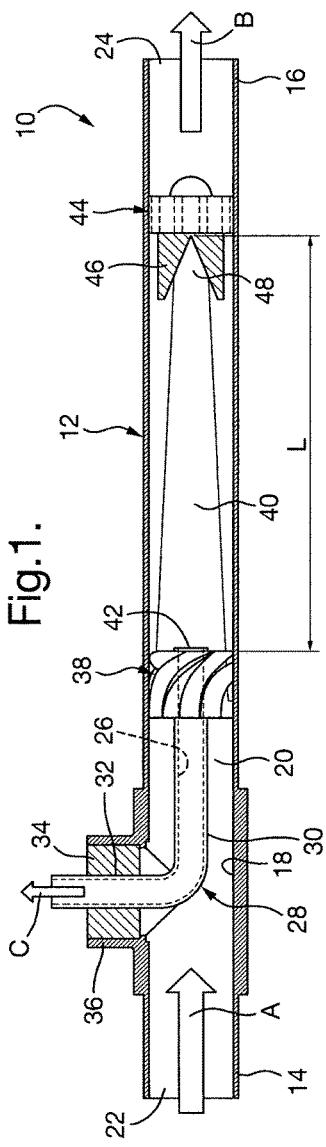
FIG. 1 is a cross sectional representation of a phase splitter in accordance with one embodiment of the present invention.

Referring to FIG. 1, one embodiment of a phase splitter in accordance with the present invention, which is indicated generally by reference number 10, is shown to comprise an elongated separator tube 12 which includes a first or upstream end 14, a second or downstream end 16 and an inner diameter surface 18 which defines a flow bore 20 that extends between the first and second ends. In use, the first and second ends 14, 16 may be connected to corresponding sections of a pipeline which is connected to, e.g., a hydrocarbon production facility.

In this embodiment of the invention, the multiphase fluid (represented by the arrow A) enters the separator tube 12 through a fluid inlet 22 which is located in the first end 14, the relatively heavy phase (represented by the arrow B) exits the separator tube through a heavy phase outlet 24 which is located in the second end 16, and the relatively light phase (represented by the arrow C) exits the separator tube through a discharge channel 26 which in this illustrative embodiment of the invention extends through a discharge pipe 28. As shown in FIG. 1, the discharge pipe 28 includes a first section 30 which extends axially through the flow bore 20 and a second section 32 which extends transversely through the separator tube 12. The discharge pipe 28 may be supported in the separator tube 12 by a gland nut 34 which is threaded into a collar 36 that is attached such as by welding to the separator tube.

The phase splitter 10 also includes a swirl element 38 which is positioned in the flow bore 20 downstream of the fluid inlet 22. In the embodiment of the invention shown in FIG. 1, the swirl element 38 is mounted in the flow tube 12 and is connected to the upstream end of the discharge pipe 28. As is well understood in the art, the swirl element 38 sets the multiphase fluid into rotation, and the resulting centrifugal forces acting on the multiphase fluid cause the heavy phase to move to the radially outer region of the flow bore 20 and the light phase to move to the radially inner region of the flow bore. The light phase will thus form an elongated core 40 which extends axially through the flow bore radially inwardly of the heavy phase from proximate the swirl element 38 toward the heavy phase outlet 24. The light phase exits the flow bore 20 through the discharge channel 26, which in this embodiment of the invention extends axially through the swirl element 38 to a discharge opening 42 in the downstream end of the swirl element.

In prior art phase splitters, fluctuations in the flow of multiphase fluid through the fluid inlet 22 may cause the light phase core to become unstable. This instability can be particularly severe near the distal end of the light phase core, i.e., the end of the light phase core closest to the heavy phase outlet 24, and can result in an undesirably large quantity of the light phase exiting the separator tube through the heavy phase outlet 24.

According to the present invention, the phase splitter 10 includes a core stabilizer for stabilizing the light phase core 40. The core stabilizer, two exemplary embodiments of which will be described below, is positioned in the flow bore 20 between the swirl element 38 and the heavy phase outlet 24. In operation of the phase splitter 10, the core stabilizer engages the distal end of the light phase core and inhibits the light phase from exiting the separator tube 12 through the heavy phase outlet 24 even under the influence of fluctuations in the flow of multiphase fluid through the fluid inlet 22. As a result, the separation efficiency of the phase splitter is greatly improved.

Figure 1A:
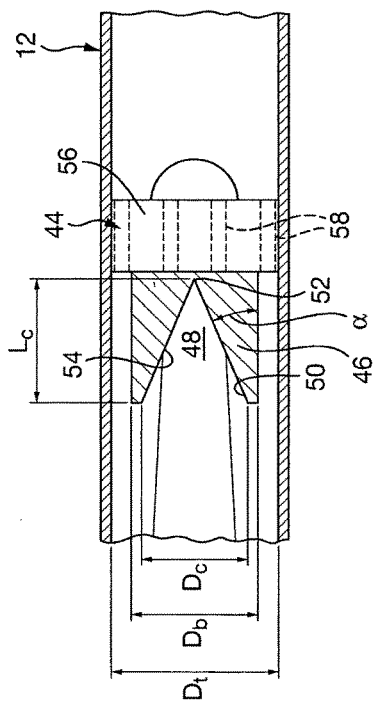
FIG. 1A is an enlarged view of a portion of the phase splitter of FIG. 1 showing more clearly the core stabilizer component of this embodiment of the invention.

In the embodiment of the invention shown in FIGS. 1 and 1A, the core stabilizer, generally 44, is shown to comprise a cylindrical stabilizer body 46 which is positioned coaxially within the separator tube 12 and includes a cavity 48 that extends partially therethrough. The cavity 48 comprises an upstream opening 50, a downstream end 52 and an inner surface 54 which converges radially inwardly from the upstream opening to the downstream end. In the embodiment of the core stabilizer 44 shown in FIGS. 1 and 1A, the inner surface 54 converges generally linearly from the upstream opening to the downstream end. For example, the inner surface 54 may converge at an angle a of between about 15° and about 45°. More preferably, the inner surface 54 may converge at an angle a of between about 25° and about 35°. Alternatively, the inner surface 54 may converge non-linearly so as to provide the cavity 48 with, e.g., a hemispherical or parabolic shape, among others.

The dimensions of the cavity 48 and the distance of the stabilizer body 46 from the swirl element 38 depend on the flow rate of the multiphase fluid entering the phase splitter 10 and the approximate percentage of light phase in the multiphase fluid. Although the ideal dimensions of the cavity 48 and distance of the stabilizer body 46 from the swirl element 38 may be determined empirically for a given separation application, the inventors have discovered that for most applications they may be determined using the following relationships. The inner diameter $D_t$ of the separator tube 12 depends in large part on the flow rate of the multiphase fluid entering the phase splitter 12. Once the inner diameter $D_t$ of the separator tube 12 is determined, the outer diameter $D_b$ of the stabilizer body 46 may be chosen to be between about 65% and about 85% of the inner diameter $D_t$, the diameter $D_c$ of the upstream opening 50 of the cavity 48 may be chosen to be between about 50% and about 70% of the inner diameter $D_t$, and the axial length $L_c$ of cavity from the upstream opening to the downstream end 52 may be chosen to be between about 100% and 150% of the diameter $D_c$ of the upstream opening. In addition, the axial distance L between the downstream end of the swirl element 38 and the upstream opening 50 of the cavity 48 may be chosen to be between about 4 times and about 5 times the inner diameter $D_t$ of the separator tube.

The stabilizer body 46 may be supported in the separator tube 12 by any suitable means. In the embodiment of the invention shown in FIGS. 1 and 1A, for example, the stabilizer body 46 is supported in the separator tube 12 by a support ring 56 which comprises a number of axial holes 58 through which the heavy phase may flow. Alternatively, the stabilizer body 46 may be supported in the separator tube 12 by a number of radial fins which extend between the body and the separator tube.

The effect that the core stabilizer 44 has on the light phase core 40 can be seen by comparing FIG. 2 with FIG. 3. FIG. 2 is an illustration obtained from a computational fluid dynamics ("CFD") simulation of the phase splitter 10. As shown in FIG. 2, the core stabilizer 44 engages the distal end of the light phase core 40 and prevents the light phase from exiting the separator tube 12 through the heavy phase outlet 24. By comparison, FIG. 3 is an illustration obtained from a CFD simulation of a phase splitter similar to the phase splitter 10 but without the core stabilizer 44. As is apparent from FIG. 3, the distal end of the light phase core 40 is unrestrained. As a result, a significant percentage of the light phase is permitted to exit the separator tube through the heavy phase outlet.

Another embodiment of a phase splitter in accordance with the present invention is shown in FIGS. 4 and 4A. The phase splitter of this embodiment of the invention, generally 100, is similar to the phase splitter 10 described above in that it comprises an elongated separator tube 12 which includes a first or upstream end 14, a second or downstream end 16 and an inner diameter surface 18 which defines a flow bore 20 that extends between the first and second ends.

In this embodiment, the multiphase fluid (represented by the arrow A) enters the separator tube 12 through a fluid inlet 22 which is located in the first end 14, the relatively heavy phase (represented by the arrow B) exits the separator tube through a heavy phase outlet 24 which is located in the second end 16, and the relatively light phase (represented by the arrow C) exits the separator tube through a discharge channel 26 which extends through a discharge body 102. The discharge body 102 is positioned coaxially within the separator tube and includes a cylindrical portion 104, a conical portion 106 which comprises a base that is attached to or formed integrally with an upstream end of the cylindrical portion, and a outlet portion 108 which extends transversely from the downstream end of the cylindrical portion through the separator tube 12. The discharge body 102 may be supported in the separator tube 12 by a gland nut 110 which is threaded into a collar 112 that is attached such as by welding to the separator tube.

The phase splitter 100 also includes a swirl element 38 which is positioned in the flow bore 20 downstream of the fluid inlet 22. As in the prior embodiment, the swirl element 38 sets the multiphase fluid into rotation, and the resulting centrifugal forces acting on the multiphase fluid cause the heavy phase to move to the radially outer region of the flow bore 20 and the light phase to move to the radially inner region of the flow bore. The light phase thus forms an elongated core 40 which extends axially through the flow bore radially inwardly of the heavy phase from proximate the swirl element 38 toward the heavy phase outlet 24. The light phase exits the flow bore 20 through the discharge channel 26, which in this embodiment of the invention includes a discharge opening 114 in the upstream end of the conical portion 106.

In this embodiment of the invention, the cylindrical portion 104 of the discharge body 102 comprises a diameter $D_1$, the base of the conical portion 106 of the discharge body comprises a diameter $D_2$ which is smaller than the diameter $D_1$, and the core stabilizer comprises a radial shoulder 116 which is formed between the cylindrical portion and the base of the conical portion.

As with the previous embodiment, the size of the core stabilizer 116 and the axial spacing of the core stabilizer and the other components of the flow body 102 from the swirl element 38 depend on the flow rate of the multiphase fluid entering the phase splitter 100 and the approximate percentage of light phase in the multiphase fluid. Although these dimensions may be determined empirically for a given separation application, the inventors have discovered that for most applications the cylindrical portion 104 may comprise a diameter $D_1$ which is between about 70% and about 90% of the inner diameter $D_t$ of the separator tube 12 and the core stabilizer 116 may comprise a radius R which is between about 6% and about 18% of the diameter $D_1$ of the cylindrical portion. In addition, the radius R of the core stabilizer 116 may be between about 10% and about 22% of the outer diameter $D_2$ of the base of the conical portion 106.

Furthermore, the axial distance $L_1$ between the downstream end of the swirl element 38 and the core stabilizer 116 may be between about 4 times and about 5 times the inner diameter of the separator tube, the axial distance $L_2$ between the downstream end of the swirl element and the discharge opening 114 may be between about 2 times and 3 times the inner diameter of the separator tube 12, and the axial length $L_3$ of the conical portion 106 may be between about 2 times and 3 times the inner diameter of the separator tube.

The effect that the core stabilizer of this embodiment of the invention has on the light phase core 40 can be seen by comparing FIG. 5 with FIG. 6. FIG. 5 is an illustration obtained from a CFD simulation of the phase splitter 100. As shown in FIG. 5, the core stabilizer 116 engages the distal end of the light phase core 40 and prevents the light phase from exiting the separator tube 12 through the heavy phase outlet 24. By comparison, FIG. 6 is an illustration obtained from a CFD simulation of a phase splitter similar to the phase splitter 100 but without the core stabilizer 116. As is apparent from FIG. 6, the distal end of the light phase core 40 is unrestrained. As a result, a significant percentage of the light phase is permitted to exit the separator tube 12 through the heavy phase outlet.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. An apparatus for separating a multiphase fluid into a relatively light phase and a relatively heavy phase, the apparatus comprising:

an elongated separator tube which comprises first and second ends, a multiphase fluid inlet located proximate the first end, a heavy phase outlet located proximate the second end, and an inner diameter surface which defines a flow bore that extends between the multiphase fluid inlet and the heavy phase outlet, the heavy phase outlet being oriented coaxially with the flow bore;

a swirl element which is positioned in the flow bore downstream of the multiphase fluid inlet and upstream of the heavy phase outlet, the swirl element being configured to rotate the multiphase fluid to thereby force the heavy phase radially outwardly toward the inner diameter surface of the separator tube and the light phase radially inwardly into a light phase core which extends axially through the flow bore from proximate the swirl element toward the heavy phase outlet; and a discharge body which is positioned within the separator tube downstream of the swirl element and upstream of the heavy phase outlet, the discharge body including a cylindrical portion which is positioned coaxially within the separator tube and a conical portion which extends axially from an upstream end of the cylindrical portion toward the swirl element;

the cylindrical portion comprising an outer diameter which is less than an inner diameter of a radially adjacent portion of the separator tube to thereby define an annulus between the cylindrical portion and the separator tube which is fluidly connected to the heavy phase outlet;

the conical portion comprising a downstream end which is connected to or formed integrally with the upstream end of the cylindrical portion, an upstream end which is axially spaced apart from the swirl element, an outer surface which converges radially from the downstream end of the conical portion to the upstream end of the conical portion, and a discharge opening which extends axially through the upstream end of the conical portion to a discharge channel that extends axially through the conical portion and the cylindrical portion;

wherein the downstream end of the conical portion comprises an outer diameter which is less than the outer diameter of the cylindrical portion to thereby define an annular core stabilizer shoulder which extends perpendicular to a central axis of the separator tube;

wherein during operation of the apparatus the core stabilizer shoulder engages the end of the light phase core to thereby prevent the light phase from flowing through the annulus and being discharged with the heavy phase through the heavy phase outlet.

2. The apparatus of claim 1, wherein the outer diameter of the cylindrical portion is between 70% and 90% of the inner diameter of the separator tube.

3. The apparatus of claim 2, wherein the core stabilizer shoulder comprises a radius which is between 6% and 18% of the outer diameter of the cylindrical portion.

4. The apparatus of claim 2, wherein the core stabilizer shoulder comprises a radius which is between 10% and 22% of the outer diameter of the downstream end of the conical portion.

5. The apparatus of claim 1, wherein the axial distance between the downstream end of the swirl element and the core stabilizer shoulder is between 4 times and 5 times the inner diameter of the separator tube.

6. The apparatus of claim 1, wherein the axial distance between the downstream end of the swirl element and the upstream end of the conical portion is between 2 times and 3 times the inner diameter of the separator tube.

7. The apparatus of claim 6, wherein the axial length of the conical portion is between 2 times and 3 times the inner diameter of the separator tube.

* * * * *